United States Patent
Doi et al.

(10) Patent No.: US 12,394,110 B2
(45) Date of Patent: Aug. 19, 2025

(54) METHOD, DEVICE AND MEDIUM WHERE AN EFFECT APPLIED TO A SEGMENT OF A VIDEO IS CHANGED ACCORDING TO POSTURE DETECTED BY A CAMERA

(71) Applicant: Sony Semiconductor Solutions Corporation, Kanagawa (JP)

(72) Inventors: Hiromasa Doi, Kanagawa (JP); Takaaki Nakagawa, Kanagawa (JP); Guangyu Wang, Beijing (CN)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 18/262,434

(22) PCT Filed: Jan. 27, 2022

(86) PCT No.: PCT/JP2022/003155
§ 371 (c)(1),
(2) Date: Jul. 21, 2023

(87) PCT Pub. No.: WO2022/163771
PCT Pub. Date: Aug. 4, 2022

(65) Prior Publication Data
US 2024/0078717 A1 Mar. 7, 2024

(30) Foreign Application Priority Data
Jan. 28, 2021 (CN) ......................... 202110119004.1

(51) Int. Cl.
*G06T 11/00* (2006.01)
*G06F 3/01* (2006.01)
(Continued)

(52) U.S. Cl.
CPC .............. *G06T 11/00* (2013.01); *G06F 3/017* (2013.01); *G06T 7/10* (2017.01); *G06T 7/50* (2017.01);
(Continued)

(58) Field of Classification Search
CPC ........ G06F 3/011; G06F 3/017; G06F 3/0304; G06T 7/50; G06T 7/70; G06T 11/00; G06T 19/006; G06Y 2207/30244
See application file for complete search history.

(56) References Cited

U.S. PATENT DOCUMENTS 10,997,728 B2 * 5/2021 Bleyer ................. G06T 19/006
2013/0077820 A1 3/2013 Marais
(Continued)

FOREIGN PATENT DOCUMENTS

JP 2016534461 A 11/2016
TW 201304520 A 1/2013
(Continued)

OTHER PUBLICATIONS

International Search Report (PCT/ISA/210), International Application No. PCT/JP2022/003155, dated May 10, 2022.
(Continued)

*Primary Examiner* — Liliana Cerullo
(74) *Attorney, Agent, or Firm* — Michael Best & Friedrich LLP

(57) ABSTRACT

The information processing method includes segment extraction processing and adjustment processing. In the segment extraction processing, a segment corresponding to a label associated with an effect is extracted from a video of a camera (20). In the adjustment processing, an application position of the effect is adjusted according to a change in a posture of the camera (20), which posture is detected by utilization of information including acceleration data, in
(Continued)

such a manner that the application position of the effect is not deviated from the extracted segment.

8 Claims, 11 Drawing Sheets

(51) Int. Cl.
  *G06T 7/10* (2017.01)
  *G06T 7/50* (2017.01)
  *G06T 7/70* (2017.01)

(52) U.S. Cl.
  CPC ...... *G06T 7/70* (2017.01); *G06T 2207/10016* (2013.01); *G06T 2207/30244* (2013.01)

(56) References Cited

U.S. PATENT DOCUMENTS

| | | | |
|---|---|---|---|
| 2014/0118247 A1 | 5/2014 | Nomura et al. | |
| 2016/0093107 A1 | 3/2016 | Yamamoto | |
| 2018/0348854 A1* | 12/2018 | Powers | G06T 7/73 |
| 2020/0050259 A1* | 2/2020 | Lam | F26B 25/12 |
| 2020/0210127 A1 | 7/2020 | Browy | |
| 2020/0326830 A1 | 10/2020 | Chen | |
| 2021/0150230 A1* | 5/2021 | Smolyanskiy | G06V 10/82 |
| 2021/0390765 A1* | 12/2021 | Laaksonen | G06T 19/006 |
| 2022/0189087 A1* | 6/2022 | Shuvi | G06T 11/60 |
| 2023/0115094 A1* | 4/2023 | Zhu | G06T 7/70 |
| | | | 345/473 |
| 2023/0188832 A1* | 6/2023 | Xu | G06F 3/04817 |
| | | | 348/333.01 |
| 2024/0062480 A1* | 2/2024 | Doi | G06T 19/006 |

FOREIGN PATENT DOCUMENTS

| | | |
|---|---|---|
| WO | 2019150431 A1 | 8/2019 |
| WO | 2020039568 A1 | 2/2020 |
| WO | 2020090316 A1 | 5/2020 |

OTHER PUBLICATIONS

Taiwanese Office Action dated Feb. 28, 2025 for corresponding Taiwanese Application No. 111100918.

* cited by examiner

METHOD, DEVICE AND MEDIUM WHERE AN EFFECT APPLIED TO A SEGMENT OF A VIDEO IS CHANGED ACCORDING TO POSTURE DETECTED BY A CAMERA

FIELD

The present invention relates to an information processing method, an information processing device, and a non-volatile storage medium.

BACKGROUND

A technology of giving an effect to a picture or a moving image by using an augmented reality (AR) technique is known. For example, an AR object generated by computer graphics (CG) is superimposed on a video of a real object photographed by a camera. As a result, a video indicating as if being in a different space is generated.

CITATION LIST

Patent Literature

Patent Literature 1: US 2020326830 A1

SUMMARY

Technical Problem

In order to generate a real video, an accurate positional relationship between a real object and an AR object is required. When an application position of an effect is deviated, a viewer may feel a feeling of strangeness.

Thus, the present disclosure proposes an information processing method, an information processing device, and a non-volatile storage medium capable of appropriately applying an effect.

Solution to Problem

According to the present disclosure, an information processing method executed by a computer is provided that comprises: extracting a segment corresponding to a label associated with an effect from a video of a camera; and adjusting an application position of the effect according to a change in a posture of the camera, which posture is detected by utilization of information including acceleration data, in such a manner that the application position of the effect is not deviated from the extracted segment. According to the present disclosure, an information processing device that executes an information process of the information processing method, and a non-volatile storage medium storing a program for causing a computer to realize the information process are provided.

DESCRIPTION OF EMBODIMENTS

In the following, embodiments of the present disclosure will be described in detail on the basis of the drawings. In each of the following embodiments, overlapped description is omitted by assignment of the same reference sign to the same parts.

Note that the description will be made in the following order.

[1. Configuration of an Information Processing Device]
[2. Information Processing Method]
[3. Hardware Configuration Example]
[4. Effect]

1. Configuration of an Information Processing Device

Figure 1:
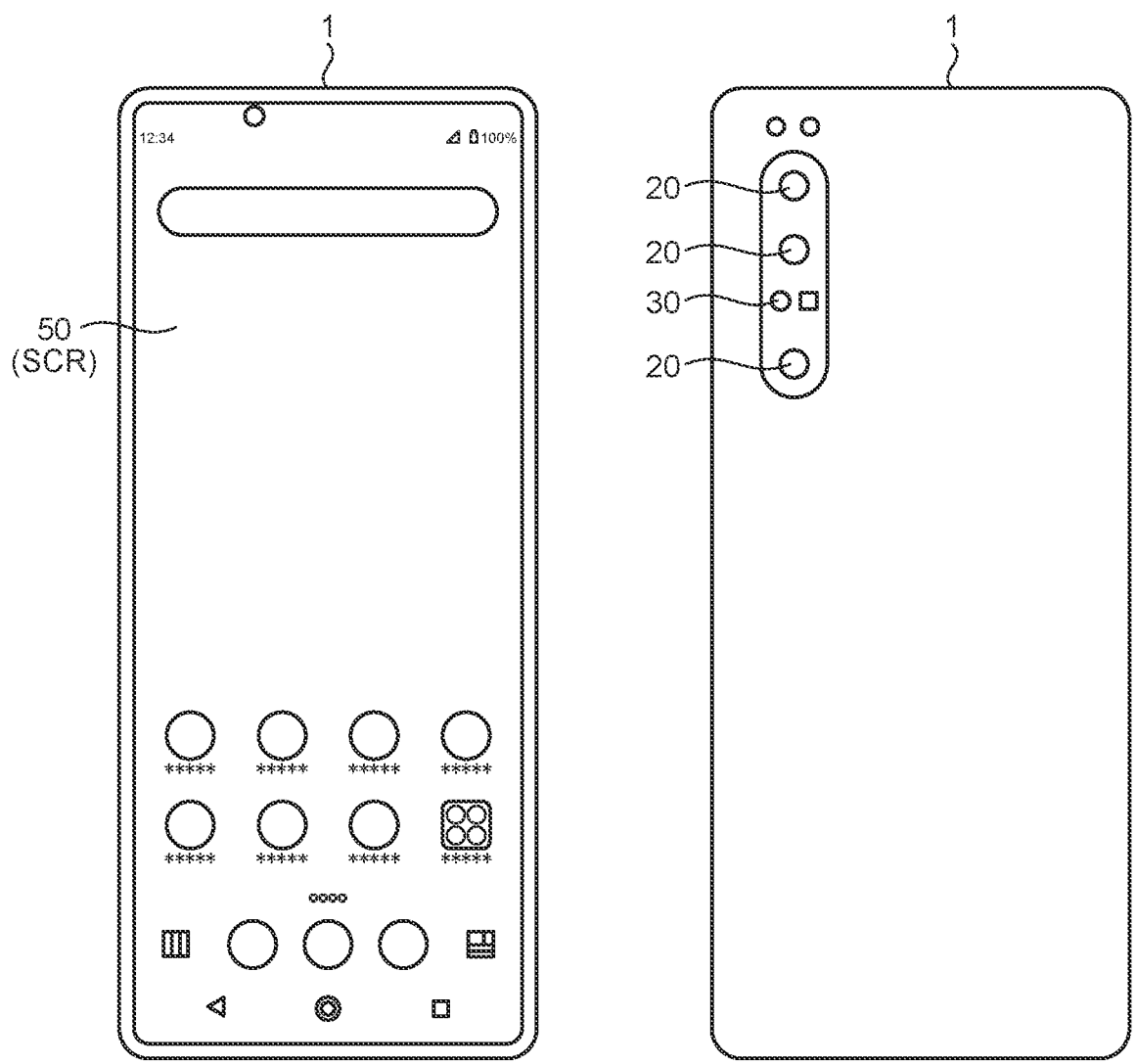
FIG. 1 is a view illustrating a schematic configuration of an information processing device.

FIG. 1 is a view illustrating a schematic configuration of an information processing device 1.

The information processing device 1 is an electronic device that processes various kinds of information such as a picture and a moving image. The information processing device 1 includes, for example, a display 50 on a front side, and a camera 20 and a time of flight (ToF) sensor 30 on a rear side.

The camera 20 is, for example, a compound eye camera in which an ultra-wide angle, a wide angle, and telephotograph can be switched. The ToF sensor 30 is, for example, a distance image sensor that detects distance information (depth information) for each pixel. A ranging method may be either direct ToF (dToF) or indirect ToF (iToF). As a method of detecting the distance information, only data of the ToF sensor 30 may be utilized, detection may be performed by utilization of output data of the ToF sensor 30 and the camera 20, or the distance information may be calculated from the data of the camera 30 by utilization of an artificial intelligence (AI) technology.

As the display 50, a known display such as a liquid crystal display (LCD) or an organic light emitting diode (OLED) is used. The display 50 includes, for example, a screen SCR on which a touch operation can be performed.

Although a smartphone is illustrated as an example of the information processing device 1 in FIG. 1, the information processing device 1 is not limited to the smartphone. The information processing device 1 may be a tablet terminal, a notebook computer, a desktop computer, a digital camera, or the like.

Figure 2:
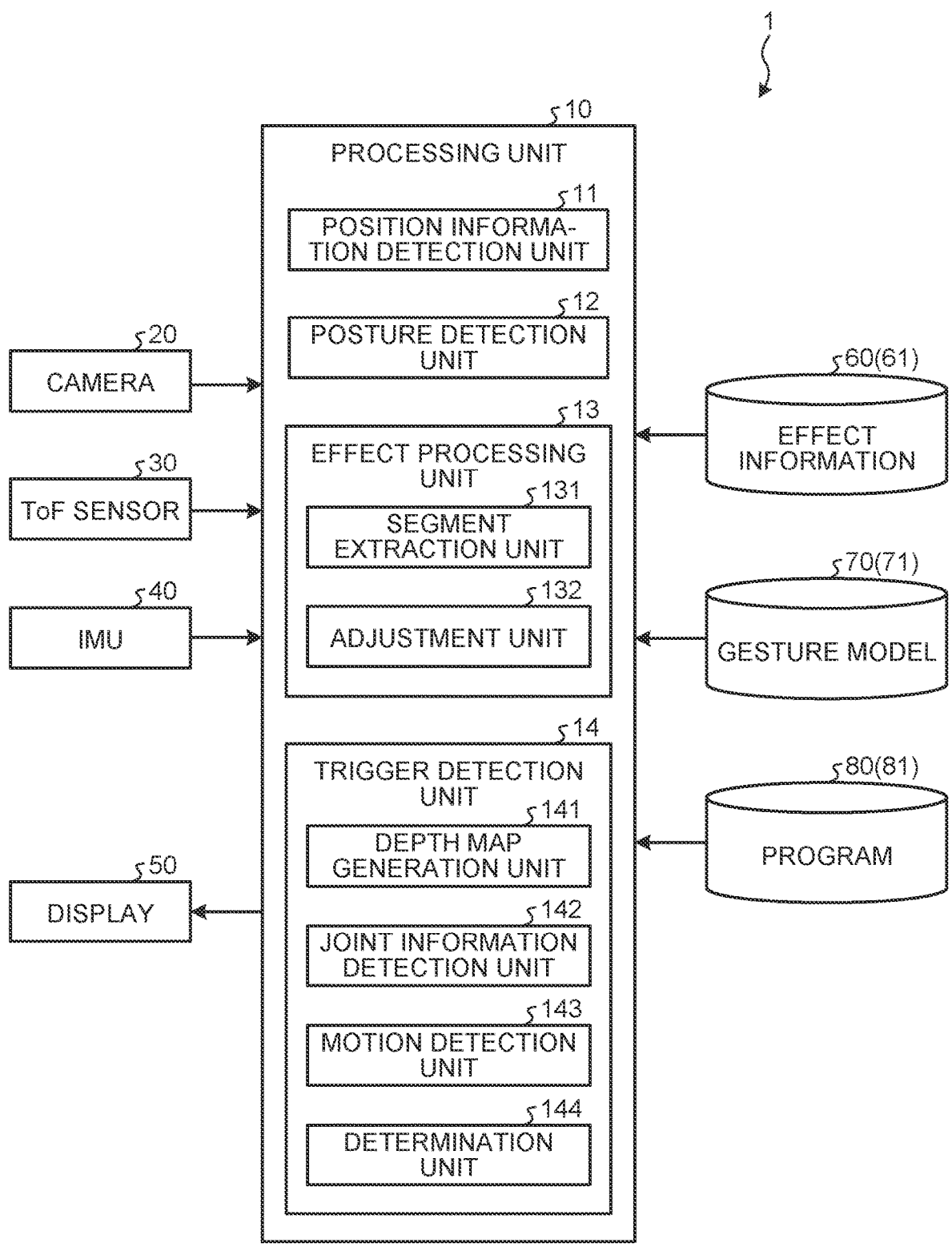
FIG. 2 is a functional block diagram of the information processing device.

FIG. 2 is a functional block diagram of the information processing device 1.

The information processing device 1 includes, for example, a processing unit 10, a camera 20, a ToF sensor 30, an inertial measurement unit (IMU) 40, a display 50, an effect information storage unit 60, a gesture model storage unit 70, and a program storage unit 80.

The processing unit 10 gives an effect to the video of the camera 20 on the basis of measurement data of the ToF sensor 30 and the IMU 40. The processing unit 10 includes, for example, a position information detection unit 11, a posture detection unit 12, an effect processing unit 13, and a trigger detection unit 14.

The position information detection unit 11 acquires depth data measured by the ToF sensor 30. The depth data includes depth information for each pixel. The position information detection unit 11 detects distance information of a real object present in a real space on the basis of the depth data.

The posture detection unit 12 acquires video data of the camera 20 and IMU data measured by the IMU 40. The video data includes data of a picture and a moving image. The IMU data includes information related to three-dimensional angular velocity and acceleration. The posture detection unit 12 detects a posture of the camera 20 by using the video data and the IMU data. Posture information related to the posture of the camera 20 is detected by utilization of a known method such as simultaneous localization and mapping (SLAM).

Note that in the present disclosure, although the posture information is detected by utilization of the video data and the IMU data, the detection method of posture information is not limited thereto. The posture information can be detected when there is acceleration data of the camera 20. Thus, the posture detection unit 12 can detect the posture of the camera 20 by using information including at least the acceleration data. By fusion of the acceleration data and another piece of sensor information, the posture information with high accuracy is detected. Thus, in the present disclosure, the posture information of the camera 20 is detected by utilization of such a sensor fusion method.

The effect processing unit 13 gives an effect to the video captured by the camera 20. Various kinds of information related to the effect, such as contents of the effect and a position to which the effect is applied are stored as effect information 61 in the effect information storage unit 60. The effect processing unit 13 performs processing of the effect on the basis of the effect information 61.

Figure 3:
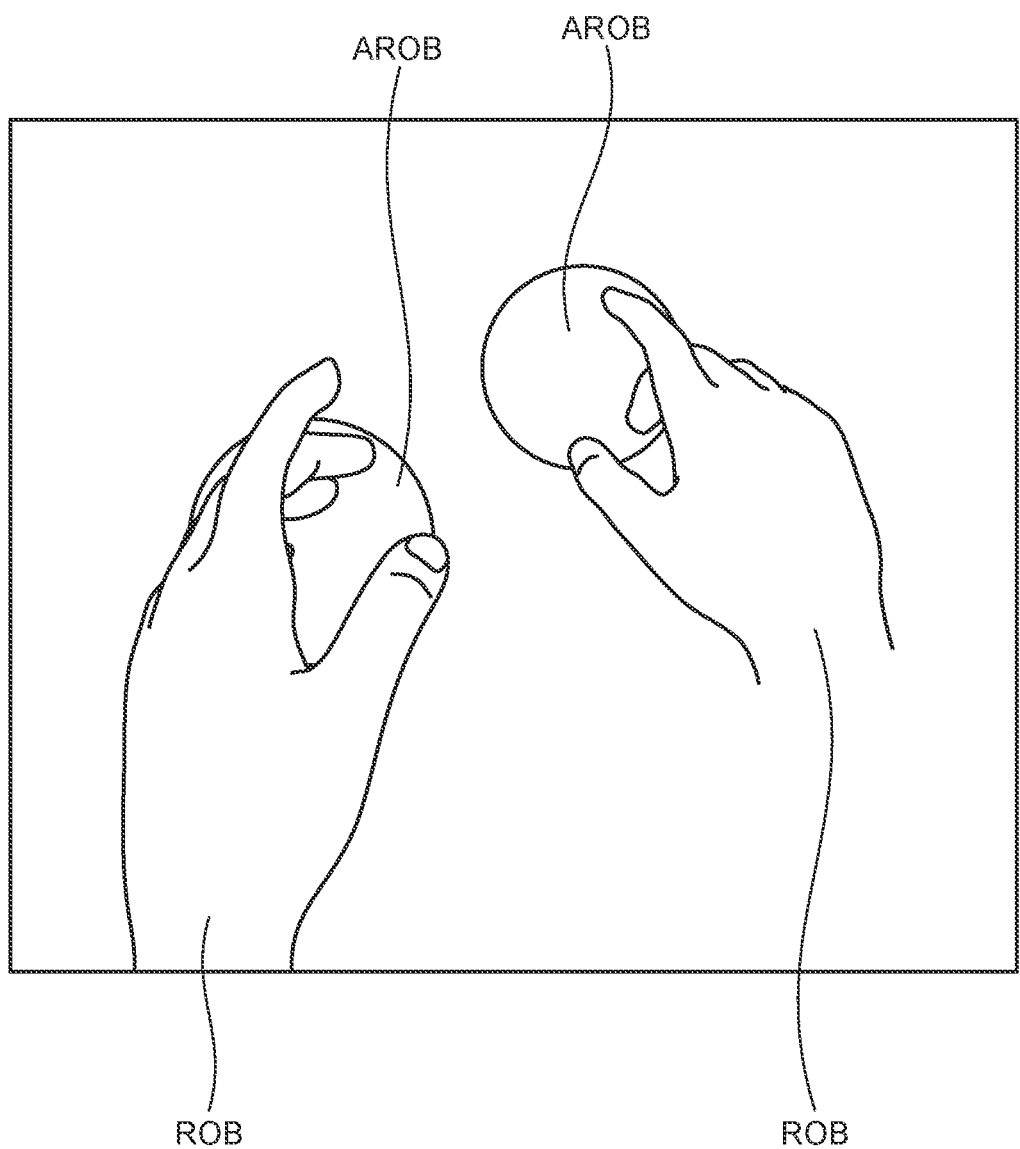
FIG. 3 is a view illustrating an example of an effect.

FIG. 3 is a view illustrating an example of the effect.

The processing of the effect is performed by utilization of, for example, an AR object AROB generated by the CG. In the example of FIG. 3, a plurality of spherical AR objects AROB is displayed in a manner of being superimposed on a real object ROB. The effect processing unit 13 detects a positional relationship between the real object ROB and the AR objects AROB on the basis of detected distance information of the real object ROB. The effect processing unit 13 performs occlusion processing on the real object ROB by the AR objects AROB on the basis of the positional relationship between the real object ROB and the AR objects AROB. The display 50 displays a result of the occlusion processing.

The occlusion means a state in which a front object hides a rear object. The occlusion processing means processing of detecting an anteroposterior relationship between objects and superimposing the objects while hiding a rear object with a front object on the basis of the detected anteroposterior relationship. For example, in a case where the real object ROB is closer to the ToF sensor 30 than the AR objects AROB, the effect processing unit 13 superimposes, as the occlusion processing, the real object ROB in front of the AR objects AROB in such a manner that the AR objects AROB are hidden by the real object ROB. In a case where the AR objects AROB are closer to the ToF sensor 30 than the real object ROB, the effect processing unit 13 superimposes, as the occlusion processing, the AR objects AROB in front of the real object ROB in such a manner that the real object ROB is hidden by the AR objects AROB.

Figure 4:
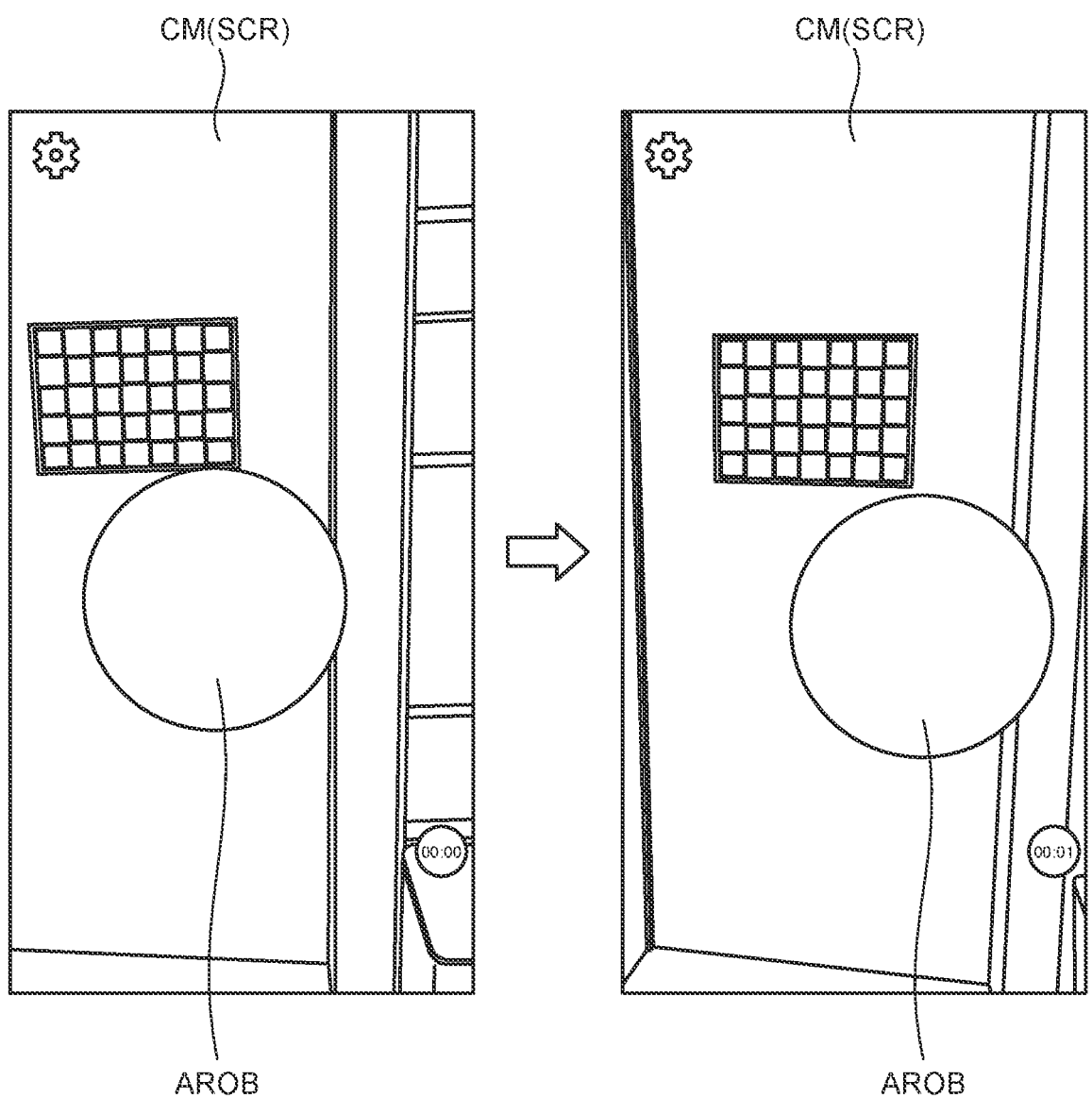
FIG. 4 is a view illustrating another example of effect processing.

FIG. 4 is a view illustrating another example of effect processing.

In the example of FIG. 4, a hole leading to a different dimensional space is displayed as the AR object AROB. A state in which a video CM of the camera 20 is deviated due to a camera shake is illustrated in FIG. 4. The effect processing unit 13 adjusts a position in which an effect is applied to the video CM on the basis of the posture of the camera 20 in such a manner that a deviation is not generated between the video CM and the AR object AROB.

Figure 5:
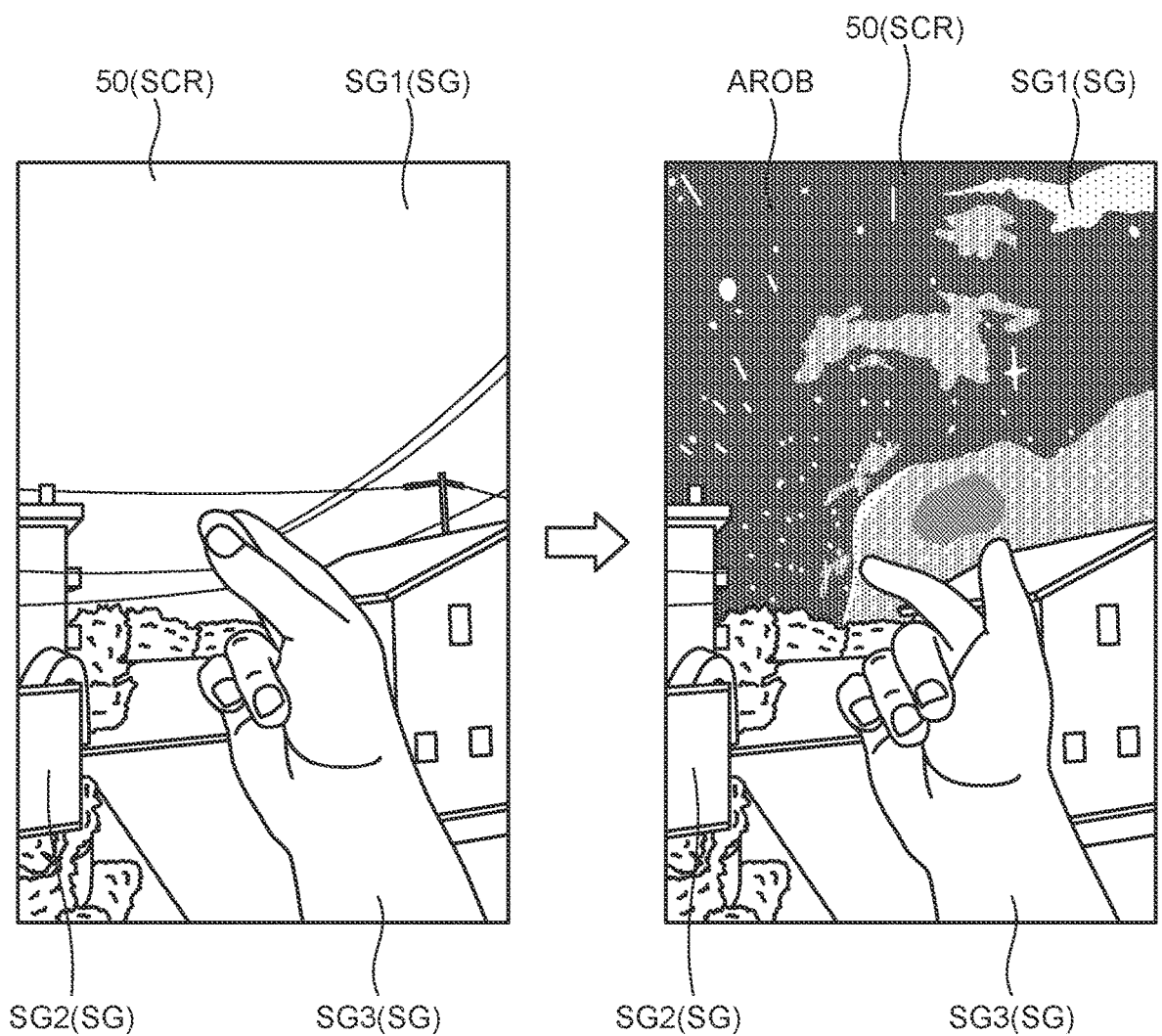
FIG. 5 is a view illustrating another example of the effect processing.

FIG. 5 is a view illustrating another example of the effect processing.

In the example of FIG. 5, an effect is selectively applied to a specific segment SG of a video CM. For example, the video CM of the camera 20 is divided into a first segment SG1 to which a label of "sky" is given, a second segment SG2 to which a label of "building" is given, and a third segment SG3 to which a label of "hand" is given. The effect is selectively applied to the first segment SG1.

A deviation between the video CM and the AR object AROB is likely to be recognized in a case where the effect is selectively applied to the specific segment. For example, in a case where the effect is applied to the first segment SG1, when an application position of the effect spreads to the second segment SG2 or the third segment SG3 due to a camera shake, an unnatural video is generated. Thus, the effect processing unit 13 adjusts the application position of the effect according to the deviation of the video CM.

For example, as illustrated in FIG. 2, the effect processing unit 13 includes a segment extraction unit 131 and an adjustment unit 132. The segment extraction unit 131 extracts a segment SG corresponding to a label associated with the effect from the video CM of the camera 20. The segment SG is extracted by utilization of a known method such as semantic segmentation. The adjustment unit 132 adjusts the application position of the effect according to a change in the posture of the camera 20 in such a manner that the application position of the effect is not deviated from the extracted segment SG. For example, in a case where the video CM is deviated to the left due to the camera shake, the application position of the effect in the screen SCR is also shifted to the left.

The trigger detection unit 14 detects a trigger for starting processing of the effect. The trigger may be anything. For example, the trigger detection unit 14 determines that the trigger is detected in a case where a specific object (trigger object) is detected or in a case where the trigger object makes a specific motion. The trigger object may be the real object ROB or the AR object AROB. The trigger is detected, for example, on the basis of the depth data. Trigger information related to the object and the motion to be the triggers is included in the effect information 61.

Figure 6:
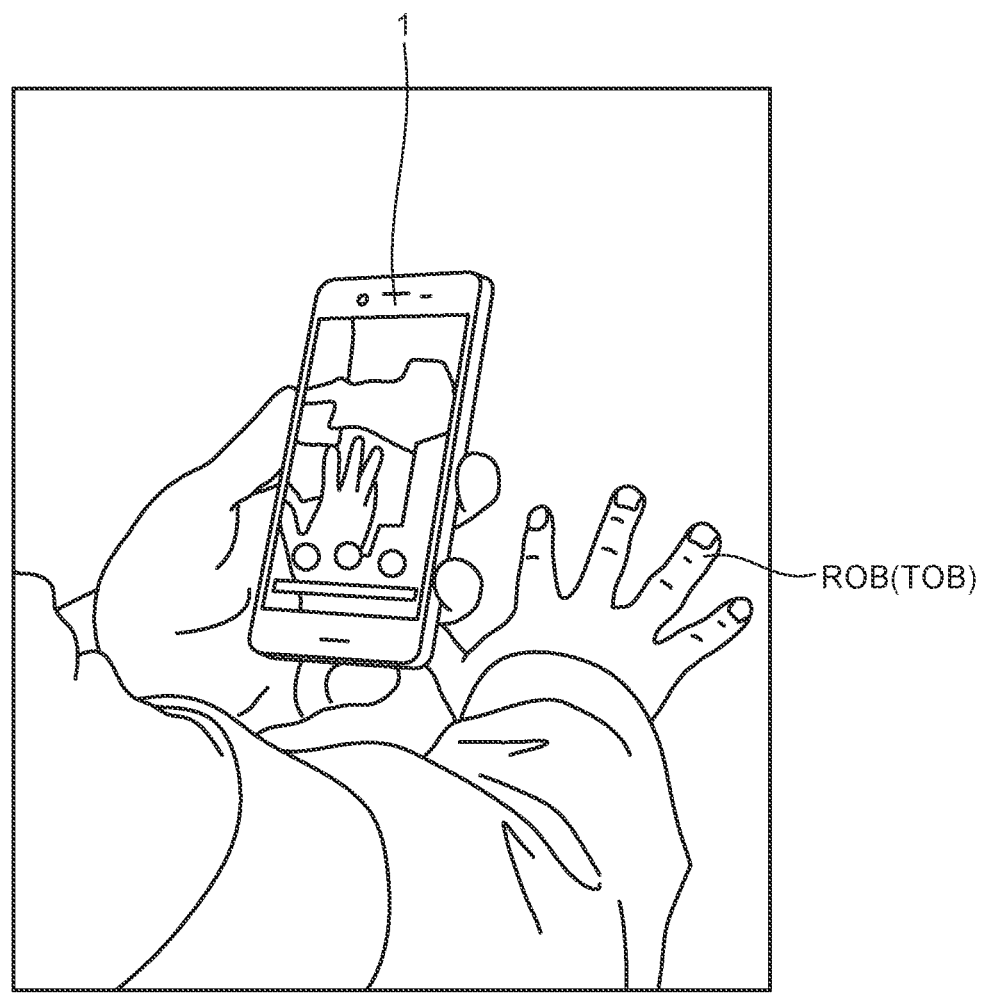
FIG. 6 is a view illustrating an example of a detection method of a trigger.
Figure 7:
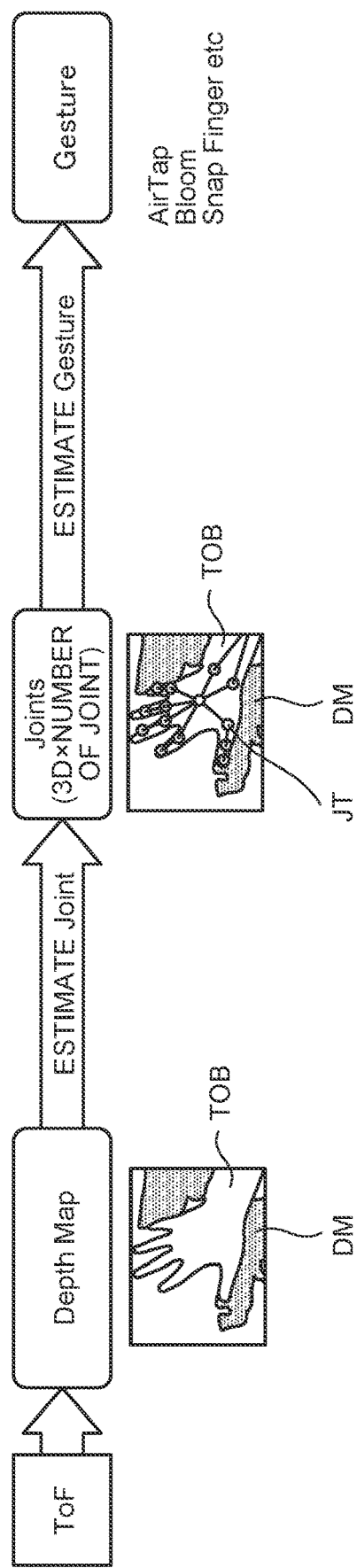
FIG. 7 is a view illustrating an example of the detection method of the trigger.

FIG. 6 and FIG. 7 are views illustrating examples of a detection method of the trigger.

In the example of FIG. 6, a gesture of a hand, finger, or the like is detected as the trigger. The trigger detection unit 14 detects a movement of the real object ROB such as a hand or a finger to be the trigger object TOB on the basis of the depth data. Then, the trigger detection unit 14 determines whether the movement of the trigger object TOB corresponds to the gesture to be the trigger.

For example, as illustrated in FIG. 2, the trigger detection unit 14 includes a depth map generation unit 141, a joint information detection unit 142, a motion detection unit 143, and a determination unit 144.

As illustrated in FIG. 7, the depth map generation unit 141 generates a depth map DM of the trigger object TOB. The depth map DM is an image in which a distance value (depth) is assigned to each pixel. The depth map generation unit 141 generates the depth map DM of the trigger object TOB at a plurality of times by using the time-series depth data acquired from the ToF sensor 30.

The joint information detection unit 142 extracts the joint information of the trigger object TOB at the plurality of times on the basis of the depth map DM at the plurality of times. The joint information includes information related to an arrangement of a plurality of joints JT set for the trigger object TOB.

Portions to be the joints JT are set for each trigger object TOB. For example, in a case where the trigger object TOB is a human hand, a center of a palm, a base of a thumb, a center of the thumb, a tip of the thumb, a center of an index finger, a tip of the index finger, a center of a middle finger, a tip of the middle finger, a center of a ring finger, a tip of the ring finger, a center of a little finger, a tip of the little finger, and two joints of a wrist are set as the joints JT. The joint information detection unit 142 extracts three-dimensional coordinate information of each of the joints JT as the joint information.

Note that the portions to be the joints JT are not limited to the above. For example, only the tip of the thumb, the tip of the index finger, the tip of the middle finger, the tip of the ring finger, the tip of the little finger, and the two joints of the wrist may be set as the joints JT. In addition to the 14 joints JT described above, other portions such as a base of the index finger, a base of the middle finger, a base of the ring finger, and a base of the little finger may be set as joints. Since the number of joints JT close to the number of joints of the hand (21) are set, a gesture is accurately detected.

The motion detection unit 143 detects the motion of the trigger object TOB on the basis of the joint information at the plurality of times. For example, the motion detection unit 143 applies the joint information at the plurality of times to a gesture model 71. The gesture model 71 is an analytical model in which a relationship between the time-series joint information and the gestures is learned by utilization of a recurrent neural network (RNN), a long short-term memory (LSTM), or the like. The gesture model 71 is stored in the gesture model storage unit 70. The motion detection unit 143 analyzes the motion of the trigger object TOB by using the gesture model 71, and detects a gesture corresponding to the motion of the trigger object TOB on the basis of a result of the analysis.

The determination unit 144 collates the gesture corresponding to the motion of the trigger object TOB with the gesture defined in the effect information 61. As a result, the determination unit 144 determines whether the motion of the trigger object TOB corresponds to the gesture to be the trigger.

Figure 8:
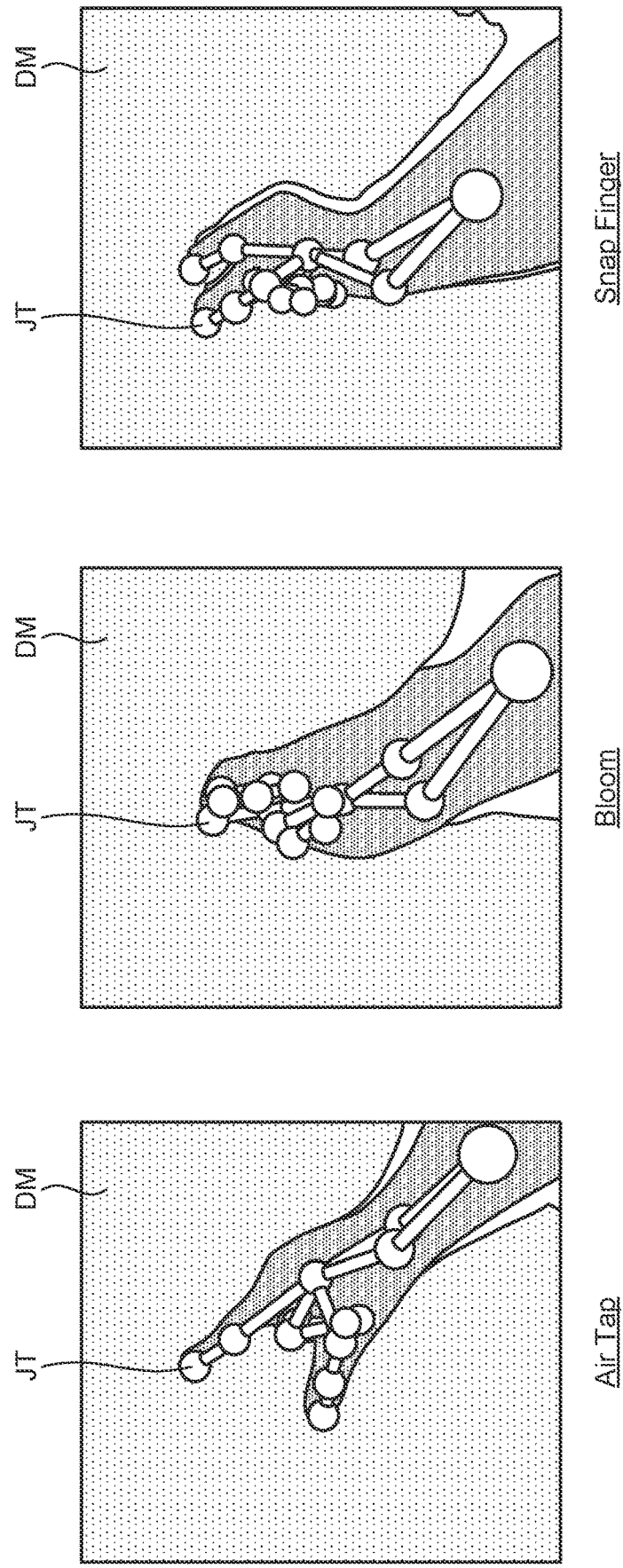
FIG. 8 is a view illustrating an example of a gesture detected by a motion detection unit.

FIG. 8 is a view illustrating an example of a gesture detected by the motion detection unit 143.

"Air Tap", "Bloom", and "Snap Finger" are illustrated as examples of the gesture in FIG. 8. "Air Tap" is a gesture of raising an index finger and tilting the index finger straight down. "Air Tap" corresponds to a click operation of a mouse and a tap operation on a touch panel. "Bloom" is a gesture of grasping a hand with a palm up and opening the hand. "Bloom" is used when an application is closed or a start menu is opened. "Snap Finger" is a gesture of rubbing a thumb and a middle finger together and snapping the fingers. "Snap Finger" is used, for example, when processing of an effect is started.

Returning to FIG. 2, the program storage unit 80 stores a program 81 executed by the processing unit 10. The program 81 is a program that causes a computer to execute information processing according to the present disclosure. The processing unit 10 performs various kinds of processing in accordance with the program 81 stored in the program storage unit 80. The program storage unit 80 includes, for example, any non-transitory non-volatile storage medium such as a semiconductor storage medium or a magnetic storage medium. The program storage unit 80 includes, for example, an optical disk, a magneto-optical disk, or a flash memory. The program 81 is stored, for example, in a non-transitory computer-readable storage medium.

2. Information Processing Method

Figure 9:
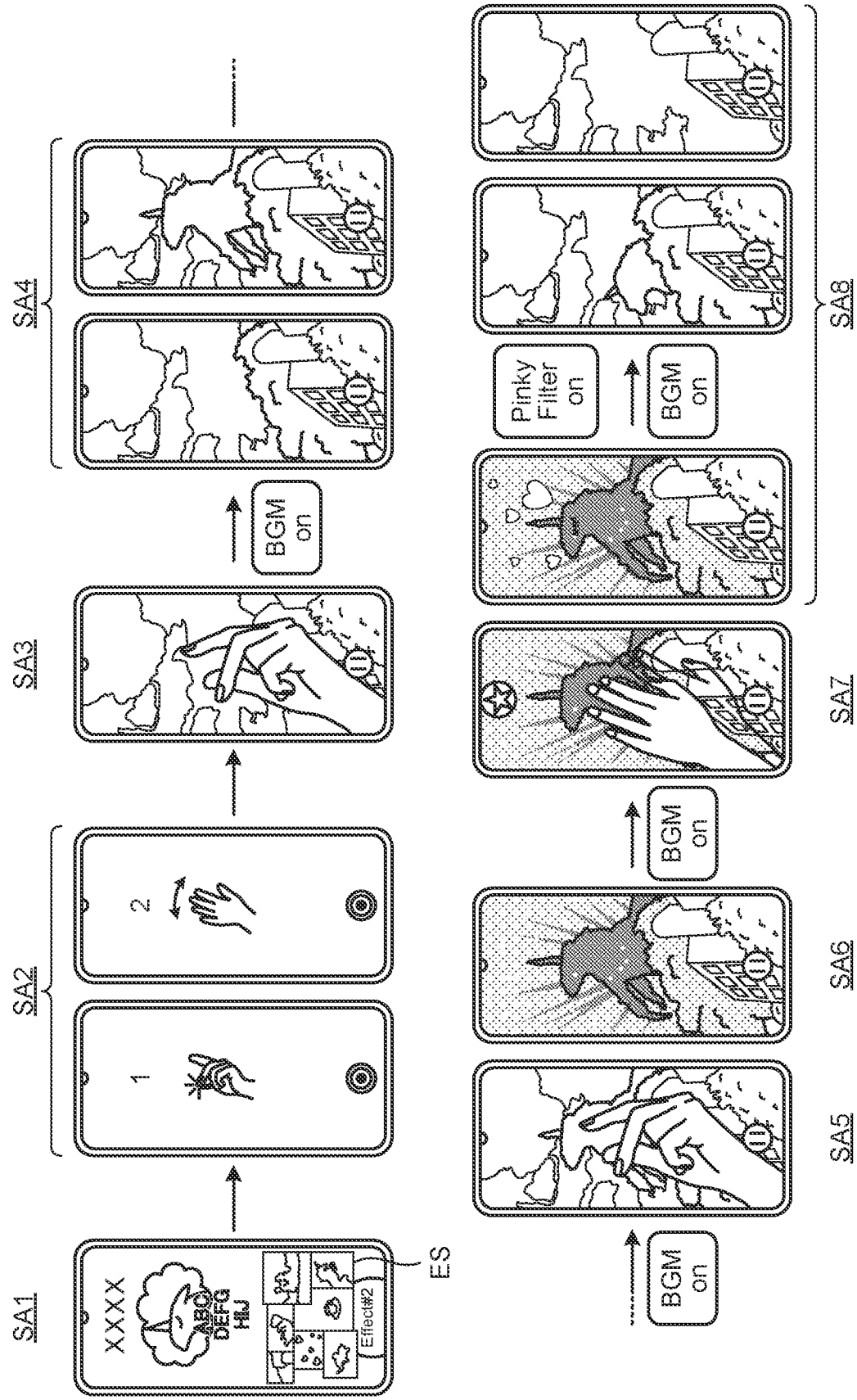
FIG. 9 is a view illustrating an example of information processing performed by the information processing device.
Figure 10:
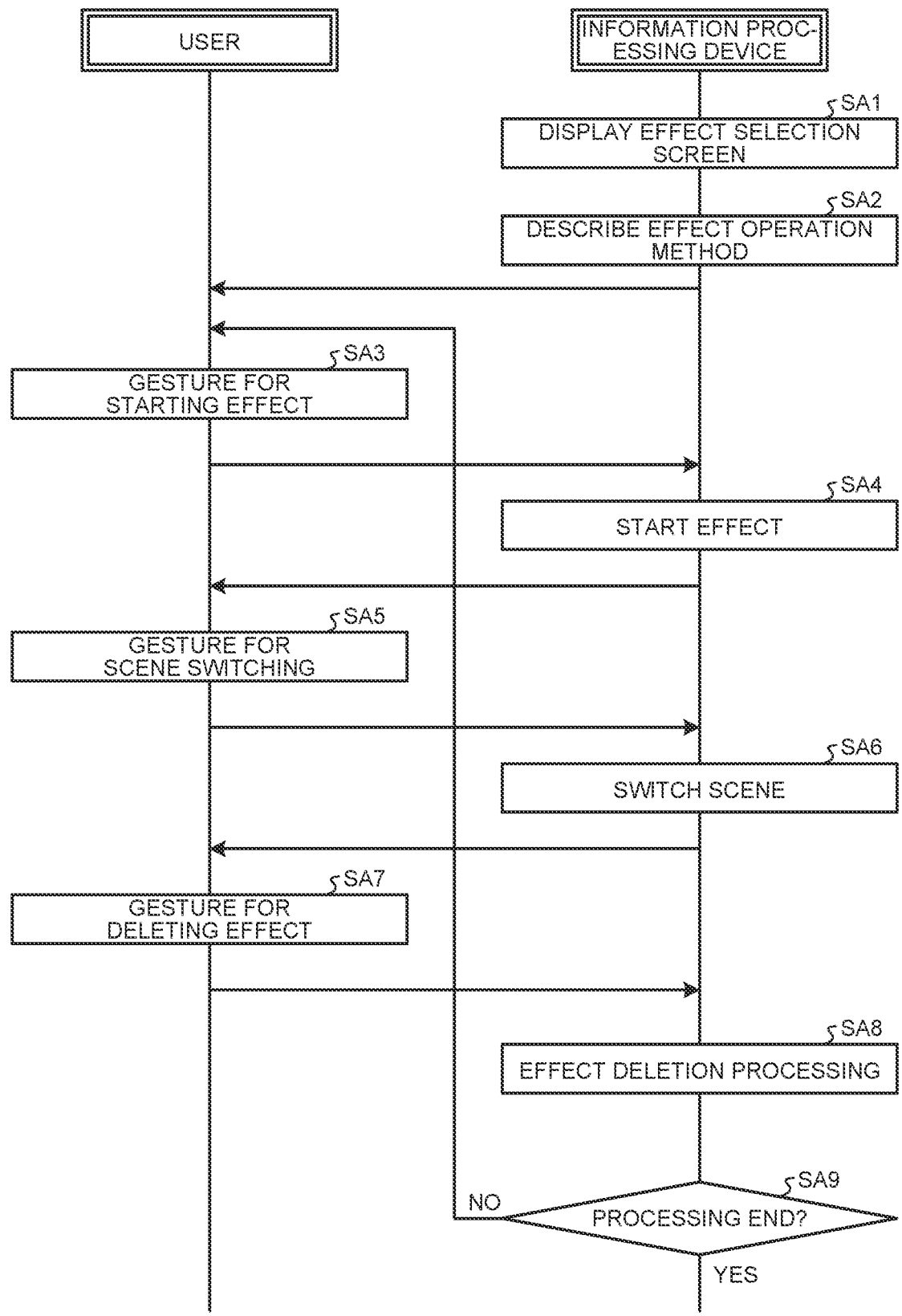
FIG. 10 is a view illustrating an example of the information processing performed by the information processing device.

FIG. 9 and FIG. 10 are views illustrating an example of information processing performed by the information processing device 1. FIG. 10 is a view illustrating a processing flow, and FIG. 9 is a view illustrating display content for each step.

In Step SA1, the processing unit 10 displays an effect selection screen ES on the display 50. For example, a list of effects is displayed on the effect selection screen ES. The user selects a desired effect from the list of effects.

In Step SA2, the processing unit 10 displays a description of an operation method of the effect on the display 50. In the example of FIG. 9, for example, it is described that processing of the effect is started by the "Snap Finger" gesture, scenes of the effect are switched by performance of the "Snap Finger" gesture again, and processing of deleting the effect is started by performance of a gesture of waving the hand right and left.

In Step SA3, the user makes the "Snap Finger" gesture in front of the camera 20. When detecting the "Snap Finger" gesture, the processing unit 10 starts the processing of the effect in Step SA4. In the example of FIG. 9, a pink cloud rises from behind a building, and a shape like a horse gradually appears.

In Step SA5, the user makes the "Snap Finger" gesture again in front of the camera 20. When detecting the "Snap Finger" gesture, the processing unit 10 switches scenes of the effect in Step SA6. In the example of FIG. 9, the sky is suddenly covered with a pink filter and a shining unicorn made of clouds appears in the sky.

In Step SA7, the user performs the gesture of waving the hand right and left in front of a camera 0. When detecting the gesture of waving the hand right and left, the processing unit 10 starts the processing of deleting the effect in Step SA8. In the example of FIG. 9, the unicorn gently smiles towards the user, lowers its head, and flies away while shaking long eyelashes. Hearts spread around the unicorn when the unicorn flies away. After the unicorn flies away, the state returns to the normal state before the processing of the effect is started.

In Step SA9, the processing unit 10 determines an end of the effect. In a case where an end flag such as pressing on an effect end button is detected, it is determined that the effect ends. In a case where it is determined in Step SA9 that the effect ends (Step SA9: Yes), the processing unit 10 ends the processing of the effect. In a case where it is not determined in Step SA9 that the effect ends (Step SA9: No), the processing returns to Step SA3, and the above-described processing is repeated until the end flag is detected.

3. Hardware Configuration Example

Figure 11:
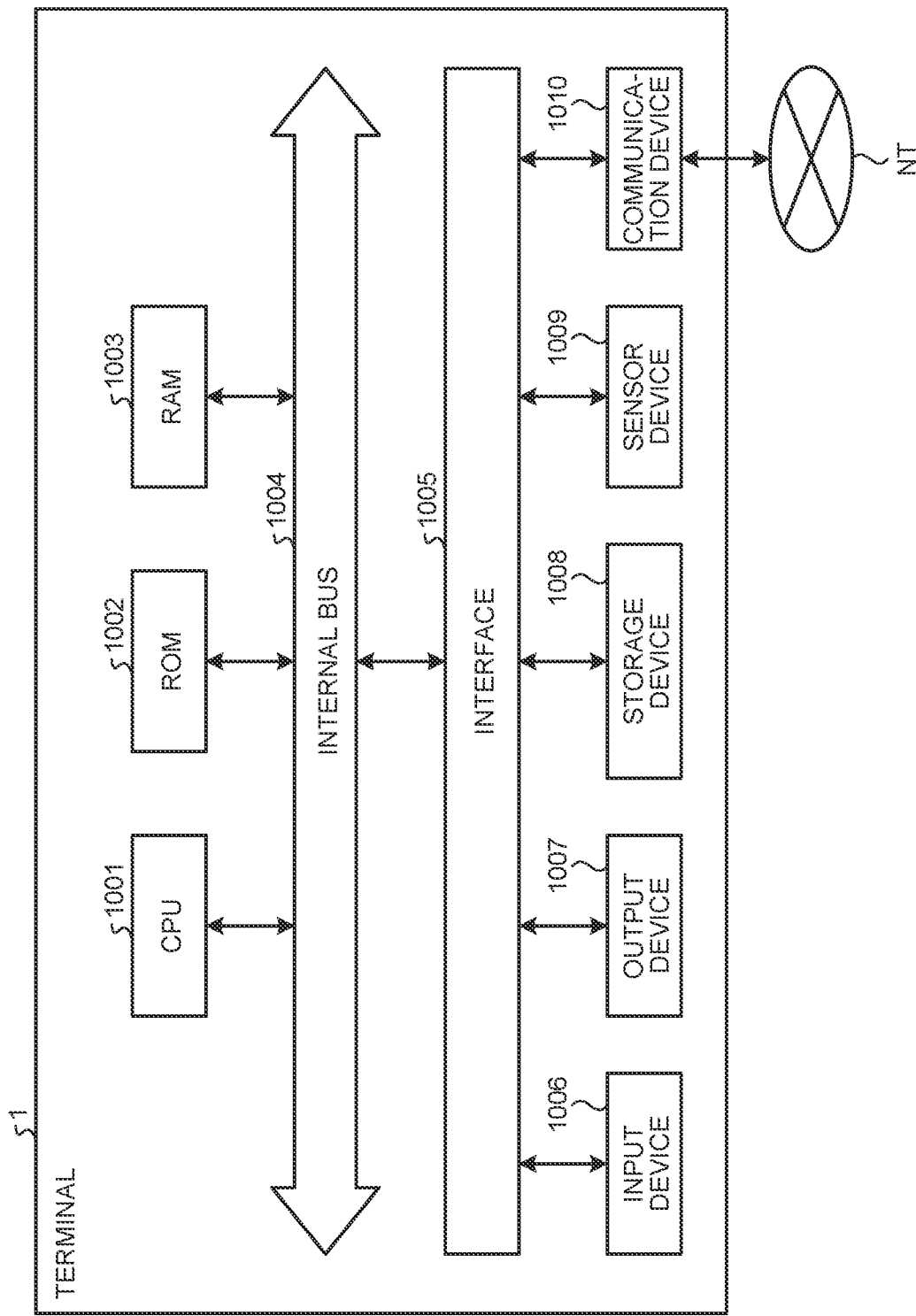
FIG. 11 is a view illustrating a hardware configuration example of the information processing device.

FIG. 11 is a view illustrating a hardware configuration example of the information processing device 1.

The information processing device 1 includes a central processing unit (CPU) 1001, a read only memory (ROM) 1002, a random access memory (RAM) 1003, an internal bus 1004, an interface 1005, an input device 1006, an output device 1007, a storage device 1008, a sensor device 1009, and a communication device 1010.

The CPU 1001 is configured as an example of the processing unit 10. The CPU 1001 functions as an arithmetic processing unit and a control device, and controls overall operations in the information processing device 1 according to various programs. The CPU 1001 may be a microprocessor.

The ROM 1002 stores programs used by the CPU 1001, operation parameters, and the like. The RAM 1003 temporarily stores the programs used in execution of the CPU 1001, parameters that appropriately change in the execution, and the like. The CPU 1001, the ROM 1002, and the RAM 1003 are mutually connected by the internal bus 1004 including a CPU bus and the like.

The interface 1005 connects the input device 1006, the output device 1007, the storage device 1008, the sensor device 1009, and the communication device 1010 to the internal bus 1004. For example, the input device 1006 exchanges data with the CPU 1001 and the like via the interface 1005 and the internal bus 1004.

The input device 1006 includes an input means for the user to input information, such as a touch panel, a button, a microphone, and a switch, and an input control circuit that generates an input signal on the basis of the input by the user and outputs the input signal to the CPU 1001. By operating the input device 1006, the user can input various kinds of data to the information processing device 1 or give an instruction thereto to perform a processing operation.

The output device 1007 includes the display 50 and a sound output device such as a speaker and a headphone. For example, the display 50 displays a video captured by the camera 20, a video generated by the processing unit 10, and the like. The sound output device converts sound data or the like into a sound and performs an output thereof.

The storage device 1008 includes the effect information storage unit 60, the gesture model storage unit 70, and the program storage unit 80. The storage device 1008 includes a storage medium, a recording device that records data into the storage medium, a reading device that reads the data from the storage medium, a deletion device that deletes the data recorded in the storage medium, and the like. The storage device 1008 stores the program 81 executed by the CPU 1001 and various kinds of data.

The sensor device 1009 includes, for example, the camera 20, the ToF sensor 30, and the IMU 40. The sensor device 1009 may include a global positioning system (GPS) reception function, a clock function, an acceleration sensor, a gyroscope, an atmospheric pressure sensor, a geomagnetic sensor, and the like.

The communication device 1010 is a communication interface including a communication device or the like for connection to a communication network NT. The communication device 1010 may be a wireless LAN compliant communication device or a long term evolution (LTE) compliant communication device.

4. Effect

The information processing device 1 includes the posture detection unit 12, the segment extraction unit 131, and the adjustment unit 132. The posture detection unit 12 detects a posture of the camera 20 by using information including acceleration data. The segment extraction unit 131 extracts a segment SG corresponding to a label associated with the effect from the video CM of the camera 20. The adjustment unit 132 adjusts the application position of the effect according to a change in the posture of the camera 20 in such a manner that the application position of the effect is not deviated from the extracted segment SG. In the information processing method of the present embodiment, the above-described processing of the information processing device 1 is executed by a computer. The non-volatile storage medium (program storage unit 80) of the present embodiment stores the program 81 that causes the computer to realize the above-described processing of the information processing device 1.

According to this configuration, even when the posture of the camera 20 changes, the effect is applied to an appropriate position.

The information processing device 1 includes the trigger detection unit 14. On the basis of depth data, the trigger detection unit 14 detects a trigger for starting the processing of the effect.

According to this configuration, the trigger is accurately detected.

The trigger detection unit 14 detects a gesture of the trigger object TOB as the trigger.

According to this configuration, the effect can be started by utilization of the gesture.

The trigger detection unit 14 includes the depth map generation unit 141, the joint information detection unit 142, the motion detection unit 143, and the determination unit 144. The depth map generation unit 141 generates the depth map DM of the trigger object TOB at a plurality of times by using the depth data. The joint information detection unit 142 detects the joint information of the trigger object TOB at the plurality of times on the basis of the depth map DM at the plurality of times. The motion detection unit 143 detects the motion of the trigger object TOB on the basis of the joint information at the plurality of times. The determination unit 144 determines whether the motion of the trigger object TOB corresponds to the gesture to be the trigger.

According to this configuration, the gesture is accurately detected.

The information processing device 1 includes the position information detection unit 11 and the effect processing unit 13. The position information detection unit 11 detects the distance information of the real object ROB on the basis of the depth data acquired by the ToF sensor 30. On the basis of the distance information of the real object ROB, the effect processing unit 13 performs the occlusion processing of the real object ROB and the AR object AROB for the effect, the AR object being generated by the CG.

According to this configuration, the positional relationship between the real object ROB and the AR object AROB is accurately detected on the basis of the depth data. Since the occlusion processing can be appropriately performed, a video causing less feeling of strangeness is provided to the viewer.

Note that the effects described in the present specification are merely examples and are not limitations, and there may be another effect.

[Supplementary Note]

Note that the present technology can also have the following configurations.

(1)

An information processing method executed by a computer, the method comprising:
  extracting a segment corresponding to a label associated with an effect from a video of a camera; and
  adjusting an application position of the effect according to a change in a posture of the camera, which posture is detected by utilization of information including acceleration data, in such a manner that the application position of the effect is not deviated from the extracted segment.

(2)

An information processing device comprising:
  a posture detection unit that detects a posture of a camera by using information including acceleration data;
  a segment extraction unit that extracts a segment corresponding to a label associated with an effect from a video of the camera; and
  an adjustment unit that adjusts an application position of the effect according to a change in the posture of the camera in such a manner that the application position of the effect is not deviated from the extracted segment.

(3)

The information processing device according to (2), further comprising
  a trigger detection unit that detects a trigger for starting processing of the effect on a basis of depth data.

(4)

The information processing device according to (3), wherein
  the depth data is acquired by a ToF sensor.

(5)

The information processing device according to (3) or (4), wherein
  the trigger detection unit detects a gesture of a trigger object as the trigger.

(6)

The information processing device according to (5), wherein
  the trigger detection unit includes
  a depth map generation unit that generates a depth map of the trigger object at a plurality of times by using the depth data,
  a joint information detection unit that detects joint information of the trigger object at a plurality of times on a basis of the depth map at the plurality of times,
  a motion detection unit that detects a motion of the trigger object on a basis of the joint information at the plurality of times, and
  a determination unit that determines whether the motion of the trigger object corresponds to the gesture to be the trigger.

(7)

The information processing device according to any one of (2) to (6), further comprising
  a position information detection unit that detects distance information of a real object on a basis of depth data acquired by a ToF sensor, and
  an effect processing unit that performs, on a basis of the distance information of the real object, occlusion processing of the real object and an AR object for the effect, the AR object being generated by CG.

(8)

A non-volatile storage medium storing a program for causing a computer to realize
  extracting a segment corresponding to a label associated with an effect from a video of a camera, and
  adjusting an application position of the effect according to a change in a posture of the camera, which posture is detected by utilization of information including acceleration data, in such a manner that the application position of the effect is not deviated from the extracted segment.

REFERENCE SIGNS LIST

1 INFORMATION PROCESSING DEVICE
11 POSITION INFORMATION DETECTION UNIT
12 POSTURE DETECTION UNIT
13 EFFECT PROCESSING UNIT
131 SEGMENT EXTRACTION UNIT
132 ADJUSTMENT UNIT
14 TRIGGER DETECTION UNIT
141 DEPTH MAP GENERATION UNIT
142 JOINT INFORMATION DETECTION UNIT
143 MOTION DETECTION UNIT
144 DETERMINATION UNIT
20 CAMERA
30 ToF SENSOR
80 PROGRAM STORAGE UNIT (NON-VOLATILE STORAGE MEDIUM)
81 PROGRAM
AROB AR OBJECT
CM VIDEO
DM DEPTH MAP
ROB REAL OBJECT
SG SEGMENT
TOB TRIGGER OBJECT

The invention claimed is:

1. An information processing method executed by a computer, the method comprising:
  dividing a video into a plurality of segments;
  giving each segment in the plurality of segments a specific label selected from a plurality of labels;
  extracting a segment from the plurality of segments, the extracted segment corresponding to the specific label given from the plurality of labels, the specific label associated with a specific effect from a video of a camera;
  selectively applying the specific effect to the extracted segment based on the specific label; and adjusting an application position of the specific effect according to a change in a posture of the camera, which posture is detected by utilization of information including acceleration data, in such a manner that the application position of the specific effect is not deviated from the extracted segment.

2. An information processing device comprising:
  a posture detection unit that detects a posture of a camera by using information including acceleration data;
  a segment extraction unit that
    divides a video into a plurality of segments,
    gives each segment in the plurality of segments a specific label selected from a plurality of labels, and
    extracts a segment from the plurality of segments, the extracted segment corresponding to the specific label given from the plurality of labels, the specific label associated with a specific effect from a video of the camera;
an effect processing unit that selectively applies the specific effect to the extracted segment based on the specific label; and
an adjustment unit that adjusts an application position of the specific effect according to a change in the posture of the camera in such a manner that the application position of the specific effect is not deviated from the extracted segment.

3. The information processing device according to claim 2, further comprising
a trigger detection unit that detects a trigger for starting processing of the effect on a basis of depth data.

4. The information processing device according to claim 3, wherein
the depth data is acquired by a time of flight (ToF) sensor.

5. The information processing device according to claim 3, wherein
the trigger detection unit detects a gesture of a trigger object as the trigger.

6. The information processing device according to claim 5, wherein
the trigger detection unit includes
a depth map generation unit that generates a depth map of the trigger object at a plurality of times by using the depth data,
a joint information detection unit that detects joint information of the trigger object at a plurality of times on a basis of the depth map at the plurality of times,
a motion detection unit that detects a motion of the trigger object on a basis of the joint information at the plurality of times, and
a determination unit that determines whether the motion of the trigger object corresponds to the gesture to be the trigger.

7. The information processing device according to claim 2, further comprising
a position information detection unit that detects distance information of a real object on a basis of depth data acquired by a time of flight (ToF) sensor, and
wherein the effect processing unit performs, on a basis of the distance information of the real object, occlusion processing of the real object and an Augmented reality (AR) object for the effect, the AR object being generated by computer graphics (CG).

8. A non-transitory computer readable medium storing a program, the program being executable by a processor to perform operations comprising:
dividing a video into a plurality of segments;
giving each segment in the plurality of segments a specific label selected from a plurality of labels;
extracting a segment from the plurality of segments, the extracted segment corresponding to the specific label given from the plurality of labels, the specific label associated with a specific effect from a video of a camera;
selectively applying the specific effect to the extracted segment based on the specific label; and
adjusting an application position of the specific effect according to a change in a posture of the camera, which posture is detected by utilization of information including acceleration data, in such a manner that the application position of the specific effect is not deviated from the extracted segment.

* * * * *